United States Patent
Owens (10) Patent No.: US 7,424,340 B2
(45) Date of Patent: Sep. 9, 2008

(54) SYSTEM AND METHOD FOR PNEUMATIC TRANSPORT

(75) Inventor: Timothy J. Owens, Erie, CO (US)

(73) Assignee: The CDA Group, LLC, Mesa, AZ (US)

( * ) Notice: Subject to any disclaimer, the term of this patent is extended or adjusted under 35 U.S.C. 154(b) by 0 days.

(21) Appl. No.: 11/623,073

(22) Filed: Jan. 13, 2007

(65) Prior Publication Data

US 2007/0173972 A1 Jul. 26, 2007

Related U.S. Application Data

(60) Provisional application No. 60/758,905, filed on Jan. 13, 2006.

(51) Int. Cl.
*G06F 7/00* (2006.01)
*B65G 51/24* (2006.01)
*B65G 53/56* (2006.01)

(52) U.S. Cl. ..................... 700/230; 406/182

(58) Field of Classification Search ............ 700/213, 700/225–226, 228–230; 406/182, 1–9, 106; 414/219–220
See application file for complete search history.

(56) References Cited

U.S. PATENT DOCUMENTS

| | | | | |
|---|---|---|---|---|
| 1,733,026 A | * | 10/1929 | McGuinness et al. | 406/1 |
| 3,337,159 A | * | 8/1967 | Hoehmann et al. | 406/83 |
| 3,536,098 A | * | 10/1970 | Cunningham | 406/182 |
| 3,627,231 A | * | 12/1971 | Kalthoff | 406/3 |
| 3,674,123 A | * | 7/1972 | Lewis et al. | 193/23 |
| 3,711,038 A | * | 1/1973 | Van Otteren | 406/19 |
| 3,829,042 A | * | 8/1974 | Torochkov et al. | 406/182 |
| 3,892,372 A | * | 7/1975 | Hauber | 406/2 |
| 3,894,372 A | * | 7/1975 | Roberts et al. | 220/560.06 |
| 4,037,805 A | * | 7/1977 | Alexandrov et al. | 406/182 |
| 4,058,274 A | * | 11/1977 | Hochradel et al. | 406/2 |
| 4,084,770 A | * | 4/1978 | Warmann | 406/149 |
| 4,395,164 A | * | 7/1983 | Beltrop et al. | 406/74 |
| 4,437,797 A | * | 3/1984 | Kardinal | 406/110 |
| 4,437,799 A | * | 3/1984 | Liu et al. | 406/198 |

(Continued)

FOREIGN PATENT DOCUMENTS

DE 7830872 2/1979

(Continued)

*Primary Examiner*—Gene O. Crawford
*Assistant Examiner*—Ramya G Prakasam
(74) *Attorney, Agent, or Firm*—Robert D. Atkins; Quarles & Brady LLP (57) ABSTRACT

A pneumatic transport system has a plurality of interconnected stations for transporting a carrier containing a material. Pneumatic travel tubes interconnect the stations. Each station has a rotatable cartridge assembly with a first tube for pass-through of the carrier, a second tube for loading the carrier, and a third tube for receiving the carrier. Each tube is configurable to be aligned with the travel tubes. A wear plate assembly is in slidable communication with the rotatable cartridge assembly. The wear plate assembly has a center plate with a solid portion, an opening for passing the carrier, and an air-pass opening. A computer system controls the configuration of the interconnected stations to provide transport of the carrier between stations while passing through intermediate stations without stopping movement of the carrier. A user interface provides for entering commands to the pneumatic transport system.

18 Claims, 6 Drawing Sheets

U.S. PATENT DOCUMENTS

| | | | |
|---|---|---|---|
| 4,442,865 A * | 4/1984 | Shigeo | 137/874 |
| 4,516,888 A * | 5/1985 | Kardinal | 406/182 |
| 4,529,335 A | 7/1985 | Hilbert et al. | |
| 5,217,328 A | 6/1993 | Lang | |
| 5,354,152 A * | 10/1994 | Reinhardt et al. | 406/3 |
| 5,735,644 A * | 4/1998 | Grosswiller et al. | 406/112 |
| 5,864,485 A * | 1/1999 | Hawthorne et al. | 700/229 |
| 5,966,309 A * | 10/1999 | O'Bryan et al. | 700/225 |
| 6,030,152 A * | 2/2000 | Steele | 406/182 |
| 6,146,057 A * | 11/2000 | Gromley et al. | 406/10 |
| 6,477,442 B1 * | 11/2002 | Valerino, Sr. | 700/213 |
| 6,659,693 B1 * | 12/2003 | Perkins et al. | 406/62 |
| 6,702,150 B2 | 3/2004 | Sumetzberger | |
| 7,039,495 B1 * | 5/2006 | Conboy et al. | 700/213 |
| 7,243,002 B1 * | 7/2007 | Hoganson et al. | 700/215 |

FOREIGN PATENT DOCUMENTS

| | | |
|---|---|---|
| DE | 3801558 | 8/1989 |
| EP | 0454662 | 10/1991 |
| FR | 2502229 | 9/1982 |

\* cited by examiner

SYSTEM AND METHOD FOR PNEUMATIC TRANSPORT

CLAIM TO DOMESTIC PRIORITY

The present non-provisional patent application claims the benefit of priority of provisional application Ser. No. 60/758,905 entitled "Pneumatic Transport System," filed Jan. 13, 2006.

FIELD OF THE INVENTION

The present invention relates in general to pneumatic transport systems and, more particularly, to a system and method of transporting materials between various stations without delaying the movement of material.

BACKGROUND OF THE INVENTION

Pneumatic tube systems are widely used in commercial applications to move articles from one location to another location. Pneumatic tube systems generally utilize a hollow cylinder or "carrier" in which the materials are placed for transport within the system. The carrier containing the materials to be transported travels through pneumatic travel tubes. Such systems have been used in department stores and banks for bi-directionally movement of currency, deposit slips, sales slips, and the like between the ends of a single tube.

Pneumatic tube systems are also commonly used in hospitals and similar medical facilities for the rapid movement of medicines, supplies, and biological samples within the building. In this setting, the user needs a more complex system than a single tube because the system must move carriers to different stations on different floors. In one application, the pharmacy may need to send carriers containing medication to one of many possible nurse's stations. The nurse's station may need to send carriers containing blood samples to the lab for analysis. In another situation, the pharmacy may want to send the medication directly to the emergency room. In such complex arrangements, a system of dedicated tubes having single end points would be impractical since multiple tubes would need to run to each of many locations.

Figures 1, 2:
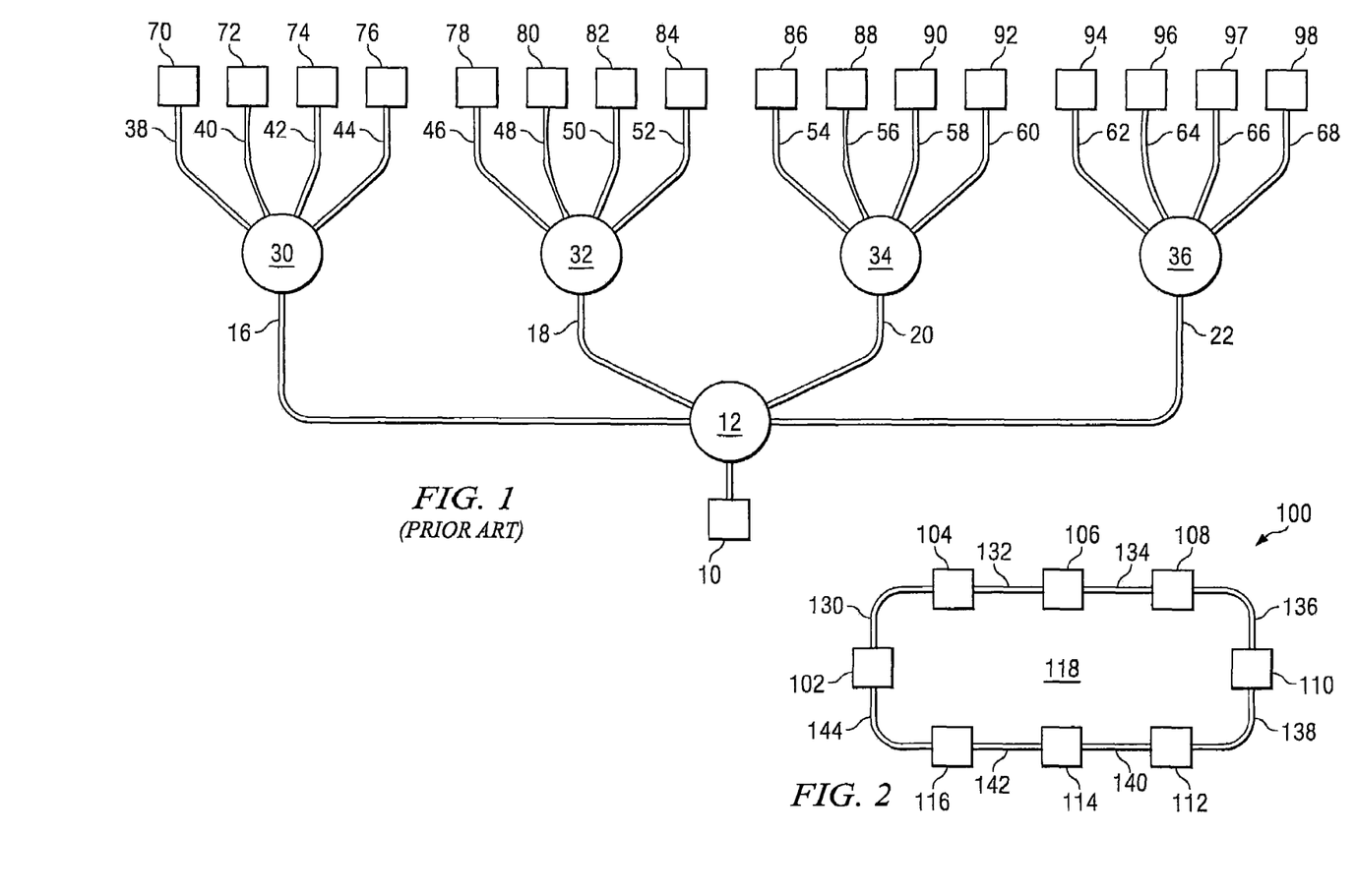
FIG. 1 illustrates a known pneumatic transport system using diverters.
FIG. 2 illustrates a pneumatic transport system arranged in a loop of stations.

To overcome this problem, "diverters", such as those described in U.S. Pat. No. 4,529,335 have been used. Briefly, a diverter has a plurality of tubes terminating in a revolving cylinder. FIG. 1 illustrates source station 10 sending a carrier through diverter 12. The diverter receives a carrier from tube 14, rotates, and then sends the carrier back out another tube, e.g., tubes 16, 18, 20, and 22. For example, a carrier from station 10 (pharmacy) travels into a diverter and stops. The diverter rotates until it is aligned with a desired exit tube. The blower then turns on and sends the carrier back out through the selected exit tube to the desired end location (nurse's station), possibly on a different floor of the hospital.

The number of locations in either direction that can be serviced is increased by employing multiple diverters. FIG. 1 illustrates diverters 30, 32, 34, and 36 being connected to tubes 16-22, respectively. Diverter 30 also connects to tubes 38, 40, 42, and 44; diverter 32 also connects to tubes 46, 48, 50, and 52; diverter 34 also connects to tubes 54, 56, 58, and 60; diverter 36 also connects to tubes 62, 64, 66, and 68. Stations 70, 72, 74, and 76 connect to tubes 38, 40, 42, and 44, respectively. Stations 78, 80, 82, and 84 connect to tubes 46, 48, 50, and 52, respectively. Stations 86, 88, 90, and 92 connect to tubes 54, 56, 58, and 60, respectively. Stations 94, 96, 97, and 98 connect to tubes 62, 64, 66, and 68, respectively.

Station 10 can route a carrier to station 70 by way of diverter 12 and diverter 30. The carrier is routed from station 10 to diverter 12 by way of tube 14 and stops. Diverter 12 rotates to align with tube 16. The carrier is then routed to diverter 30 and stops. Diverter 30 rotates to align with tube 38. The carrier is routed to station 70. In another example, station 72 can send a carrier to station 98 by way of diverter 30, diverter 12, and diverter 36. The carrier is routed from station 72 to diverter 30 by way of tube 40 and stops. Diverter 30 rotates to align with tube 16. The carrier is then routed to diverter 12 and stops. Diverter 12 rotates to align with tube 22. The carrier is then routed to diverter 36 and stops. Diverter 36 rotates to align with tube 68. The carrier is routed to station 98. A return trip from station 98 to station 72, which is common, uses the same tubes and diverters in the opposite order. The carrier moving from station 72 to station 98 and back again may require eight diverter rotations plus two carrier stops plus two carrier starts each by three different diverters. In general, the carrier may be required to stop at each diverter depending on the specific layout.

Yet, even with the flexibility of the pneumatic system of FIG. 1, the number of inlet and outlet tubes possible on any given diverter is limited due to space concerns and limitations on the size of the rotational mechanisms. In addition, each station is an end point that relies upon a dedicated diverter for sending and receiving a carrier. Accordingly, the needs of even a modest hospital require many diverters in order to service the large number of entry points. Diverters also increase travel time due to stoppage of the carrier and the rotation to align with different tubes, increase maintenance costs due to failure of the moving parts of the diverters, and have relatively high capital costs.

Accordingly, a need exists for a pneumatic transport system that decreases travel time and reduces system capital costs.

SUMMARY OF THE INVENTION

In one embodiment, the present invention is a pneumatic transport system comprising a carrier containing a material. A plurality of interconnected stations transports the carrier. Each station has first and second pneumatic travel tubes for interconnecting the stations, and a rotatable cartridge assembly having a plurality of tubes which are each configurable to be aligned with the first and second pneumatic travel tubes. A computer system controls the configuration of each of the plurality of interconnected stations to provide transport of the carrier between first and second stations while passing through intermediate stations between the first and second stations without stopping movement of the carrier.

In another embodiment, the present invention is a pneumatic transport system comprising a carrier containing a material. A first and second chain of interconnected stations transport the carrier. Each station has first and second pneumatic travel tubes for interconnecting the stations, and a rotatable cartridge assembly having a plurality of tubes which are each configurable to be aligned with the first and second pneumatic travel tubes. A diverter connects the first and second chains of interconnected stations. A computer system controls the configuration of each of the plurality of interconnected stations to provide transport of the carrier between first and second stations.

In another embodiment, the present invention is a computer-controlled pneumatic transport system comprising a plurality of interconnected stations for transporting a carrier. Each station has first and second pneumatic travel tubes for interconnecting the stations, and a rotatable cartridge assembly having a plurality of tubes which are each configurable to be aligned with the first and second pneumatic travel tubes.

In another embodiment, the present invention is a computer-implemented method of controlling pneumatic transport of carriers comprising the steps of transporting a carrier through a plurality of stations interconnected by pneumatic travel tubes, rotating a cartridge assembly within each station to align cartridge tubes with the pneumatic travel tubes, and controlling the configuration of each of the plurality of stations to provide transport of the carrier between first and second stations while passing through intermediate stations between the first and second stations without stopping movement of the carrier.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Referring to FIG. 2, a pneumatic transport system 100 is shown having a plurality of pass-through entry stations 102, 104, 106, 108, 110, 112, 114, and 116. In the present discussion, pneumatic transport system 100 will be described in terms of a hospital transport system. The system can be used in any application where there is a need to transport material from one location to another location, e.g., manufacturing plants, financial transaction processing centers, businesses, retail, government facilities, shipping services, universities, hotels, etc. In the present example, station 102 may be located in the hospital pharmacy, stations 104-108 may be individual nurse's desks, station 110 may be patient admitting, station 112 may be an emergency room, station 114 may be x-ray, and station 116 may be a laboratory.

Each pass-through entry station has several functions. In one aspect, each station can receive a carrier containing a material to be transported. A carrier is a hollow, cylindrical vessel or container with an access door or hatch that can be opened and closed. The carrier must be suitable to transport through a pneumatic tube under air pressure. The carrier typically has bumper guards on each end to absorb the impact of traveling through the pneumatic tubes and the sudden stop at the destination station without damaging the material inside. The material can be anything that can disposed within the carrier for transport from one location to another. In a hospital setting, the material can be orders, records, medicines, supplies, and biological samples. In a business or industrial setting, the material can be documents, receipts, reports, component parts, just to name a few. The user places the material in the carrier and closes the carrier access door. The user gains access to the pass-through entry station, typically through a panel or access door and introduces the carrier in the pneumatic system. Each station has the ability to pass through carriers or receive carriers originating from other stations.

Pneumatic transport system 100 is arranged in "loops" or "zones" to allow carriers to move from station to station within the loop under computer control. As shown in FIG. 2, in loop 118, station 102 is connected to station 104 by way of pneumatic travel tube 130 for routing the carrier between the stations; station 104 is connected to station 106 by way of pneumatic travel tube 132; station 106 is connected to station 108 by way of pneumatic travel tube 134; station 108 is connected to station 110 by way of pneumatic travel tube 136; station 110 is connected to station 112 by way of pneumatic travel tube 138; station 112 is connected to station 114 by way of pneumatic travel tube 140; station 114 is connected to station 116 by way of pneumatic travel tube 142; station 116 is connected to station 102 by way of pneumatic travel tube 144. Each pneumatic travel tube is generally circular in cross section and sufficiently airtight that either a vacuum or over-pressure induced in the tube causes movement of air to transport carriers contained within the tube.

The stations within a loop are organized in different logical layouts or chains. For example, the loop may connect highly interactive areas to aid in rapid transport of materials between hospital facilities that frequently interact and need quick response, e.g., loop 118 may connect patient admitting with the emergency room, x-ray, and blood analysis laboratory. Alternatively, the loop may connect areas in close proximity, e.g., loop 118 may cover one floor or wing of a hospital.

The computer system controls entry and movement of carriers within the tubes, including the speed at which the carrier moves within the tubes. The computer controls whether each station within the loop will pass through the carrier or capture the carrier. To transport a carrier from station 102 to station 108, the carrier is introduced into station 102. Stations 104 and 106 are intermediate between stations 102 and 108 and are set by the computer system to pass through the carrier. Station 108 is set by the computer system to receive or capture the carrier. The carrier passes from station 102, through intermediate stations 104 and 106 without stopping, and is deposited at station 108. Pneumatic transport system 100 is bi-directional. To transport a carrier from station 108 to station 102, the carrier is introduced into station 108. Intermediate stations 106 and 104 are set by the computer system to pass through the carrier. Station 102 is set by the computer system to receive the carrier. The carrier passes from station 108, through intermediate stations 106 and 104 without stopping, and is deposited at station 102.

Likewise, to transport a carrier from station 116 to station 110, the carrier is introduced into station 116. Stations 112 and 114 are intermediate between stations 116 and 110 and are set by the computer system to pass through the carrier. Station 110 is set by the computer system to receive the carrier. The carrier passes from station 116, through intermediate stations 114 and 112 without stopping, and is deposited at station 110. To transport a carrier from station 110 to station 116, the carrier is introduced into station 110. Intermediate stations 112 and 114 are set by the computer system to pass through the carrier. Station 116 is set by the computer system to receive the carrier. The carrier passes from station 110, through intermediate stations 112 and 114 without stopping, and is deposited at station 116. As discussed below, pneumatic transport system 100 will select the most efficient route, which may be but is not necessarily the shortest route.

Figure 3:
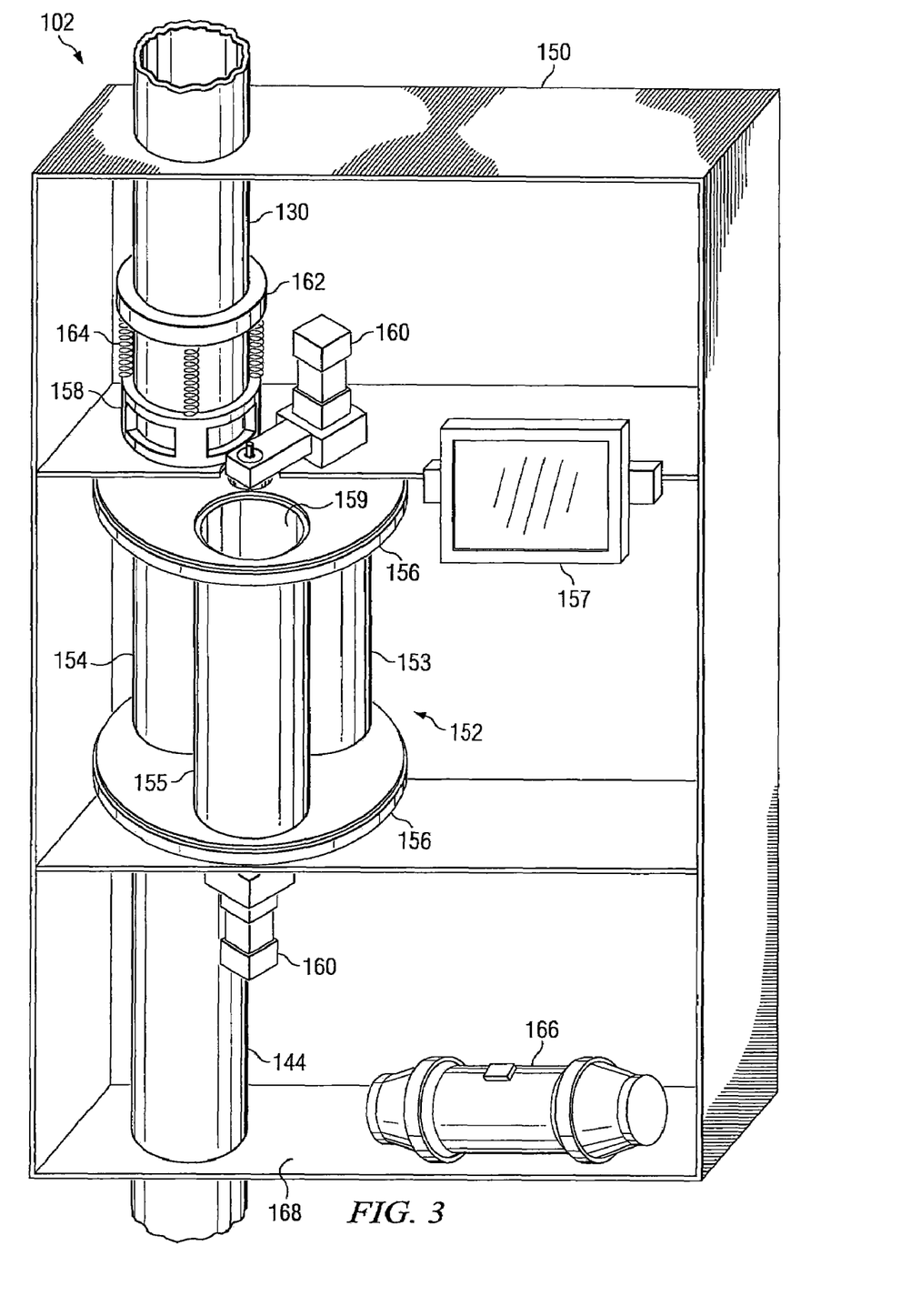
FIG. 3 illustrates a station with rotating cartridge assembly with tubes aligned to the pneumatic travel tubes.

Further detail of pass-through entry station 102 is shown in FIG. 3 as exemplary of the other stations. The pass-through entry station 102 has housing 150 with access door. Inside the station housing, a rotatable cartridge assembly 152 has a plurality of cartridge tubes 153, 154, and 155. End plates 156 cap the cartridge assembly and form an airtight seal with collar 158. The cartridge assembly 152 rotates by electric motors 160 under computer control and aligns with respect to pneumatic travel tubes 130 and 144. Control panel 157 receives operator commands to control the system, e.g., by computer keyboard or touch screen. When cartridge assembly 152 rotates, collar 158 is biased against the surface of the end plates 156 to prevent loss of vacuum between cartridge tube assembly 152 and travel tubes 130 and 144, while reducing wear on the engaged surfaces and preventing loss of pressure from the pneumatic system. Collar 158 may be a single piece fitted around travel tubes 130 and 144 and downwardly biased by gravity. Collar 158 may also include ring 162 that is rigidly affixed to the outside surface of travel tubes 130 and 144 and a plurality of springs 164 to bias collar 158 away from ring 162.

Figure 4:
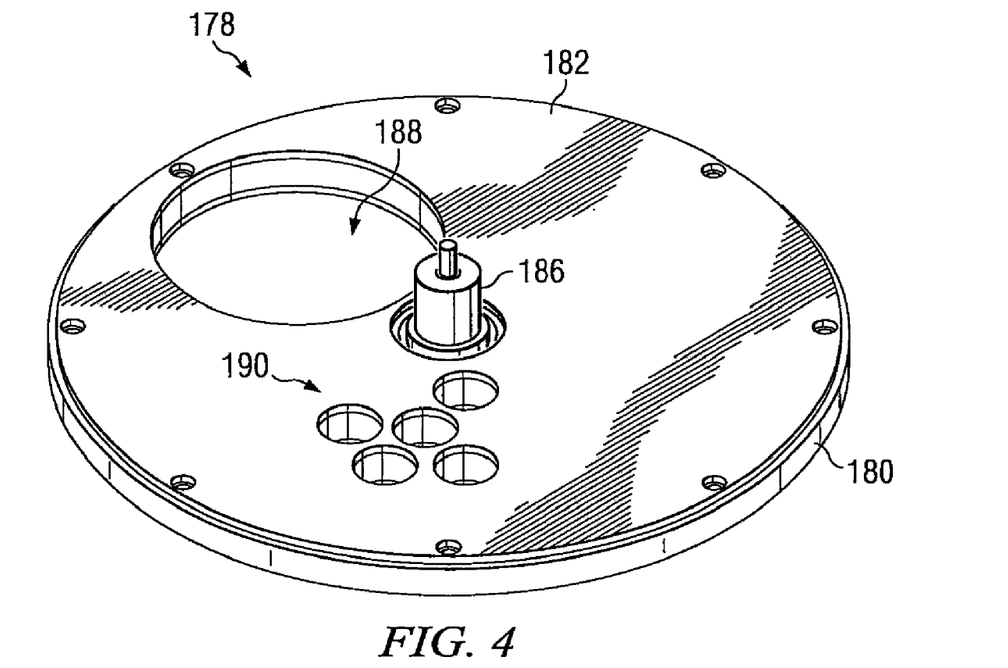
FIG. 4 illustrates a wear plate assembly for the rotating cartridge assembly.

FIG. 4 illustrates wear plate assembly 178 as having center plate 180 and wears plates 182, which are removably attached to the upper and lower surfaces of center plate 180. Wear plates 182 are formed of plastic or other low friction material and are in slidable communication with cartridge end plates 156. Wear plates 182 may be contiguous with center plate 180. Wear plate assembly 178 further includes a center spring mechanism 186 to bias the weight of cartridge assembly 152 off wear plates 182 to reduce the rate of wear. Wear plate assembly 178 includes carrier pass opening 188 and air-pass openings 190 in center plate 180 and wear plates 182, but is otherwise a solid, contiguous surface.

Consider the operation of pass-through entry station 102 with pneumatic transport system 100 described as follows. The user places the material to be transported into carrier 166 of FIG. 3. The user closes carrier 166 and loads it into cartridge tube 155 through opening 159. Using the control panel 157, the user enters the destination of the carrier 166 containing the material to be transported. The operator may further specify the materials enclosed in the carrier 166. The computer system determines the most efficient route to the destination in order to send the carrier in the appropriate direction within the tube.

The computer control engages electric motors 160 to rotate cartridge assembly 152 such that loading cartridge tube 155 aligns with pneumatic travel tubes 130 and 144. Wear plate assembly 178 rotates such that air-pass openings 190 are aligned with the pneumatic travel tubes to support carrier 166. The pneumatic system is pressured to send carrier 166 toward its destination station.

In the present example, assume the destination is station 108. The most efficient path is determined to be through stations 104 and 106. The most efficient path could have been through stations 116, 114, 112, 110, if the path through station 104 and 106 is busy with another transport operation, or if station 104 or 106 is not operational. The computer system controls cartridge assemblies 152 in stations 104 and 106 to align cartridge tubes 154 with the pneumatic travel tubes associated with each station. In other words, the pneumatic transport system 100 automatically aligns each intermediate station in the carrier's path to a pass-through mode so the carrier passes through each intermediate station without stopping. With the unique configuration of the intermediate stations in pneumatic transport system 100, the carrier does not stop once in motion. Wear plate assembly 178 of stations 104 and 106 is rotated such that carrier pass opening 188 is aligned with the pneumatic travel tubes. The cartridge assembly 152 in stations 104 and 106 acts like any other section of travel tube to pass through the carrier toward the next station.

The computer system further controls cartridge assembly 152 for station 108 to be in capture mode by aligning receiving cartridge tube 153 with the pneumatic travel tubes for station 108 to stop carrier 166. Wear plate assembly 178 of station 108 rotates such that the solid portion is aligned with the pneumatic travel tubes. The pneumatic transport system 100 automatically slows down the flow of air to slow the speed of carrier 166 as it approaches station 108 in order to prevent damage to materials that are sensitive to high gravitational forces that may be generated as the carrier accelerates and decelerates. As the carrier approaches its destination station as indicated by a pressure build-up from the column of air in front of the carrier, a pressure relief valve opens in response to the pressure build-up to reduce the pressure in the pneumatic travel tube which slows the carrier's approach into the station.

Accordingly, the carrier 166 travels from station 102, through intermediate stations 104 and 106, without stopping, to its destination and is deposited in receiving cartridge tube 153 of station 108. As carrier 166 approaches station 108, the solid surface provides backpressure to slow carrier 166 and supports carrier 166 within station 108. The cartridge assembly 152 in station 108 rotates away from the pneumatic travel tubes and carrier 166 falls from receiving cartridge tube 153 into drop bin 168.

Figure 5:
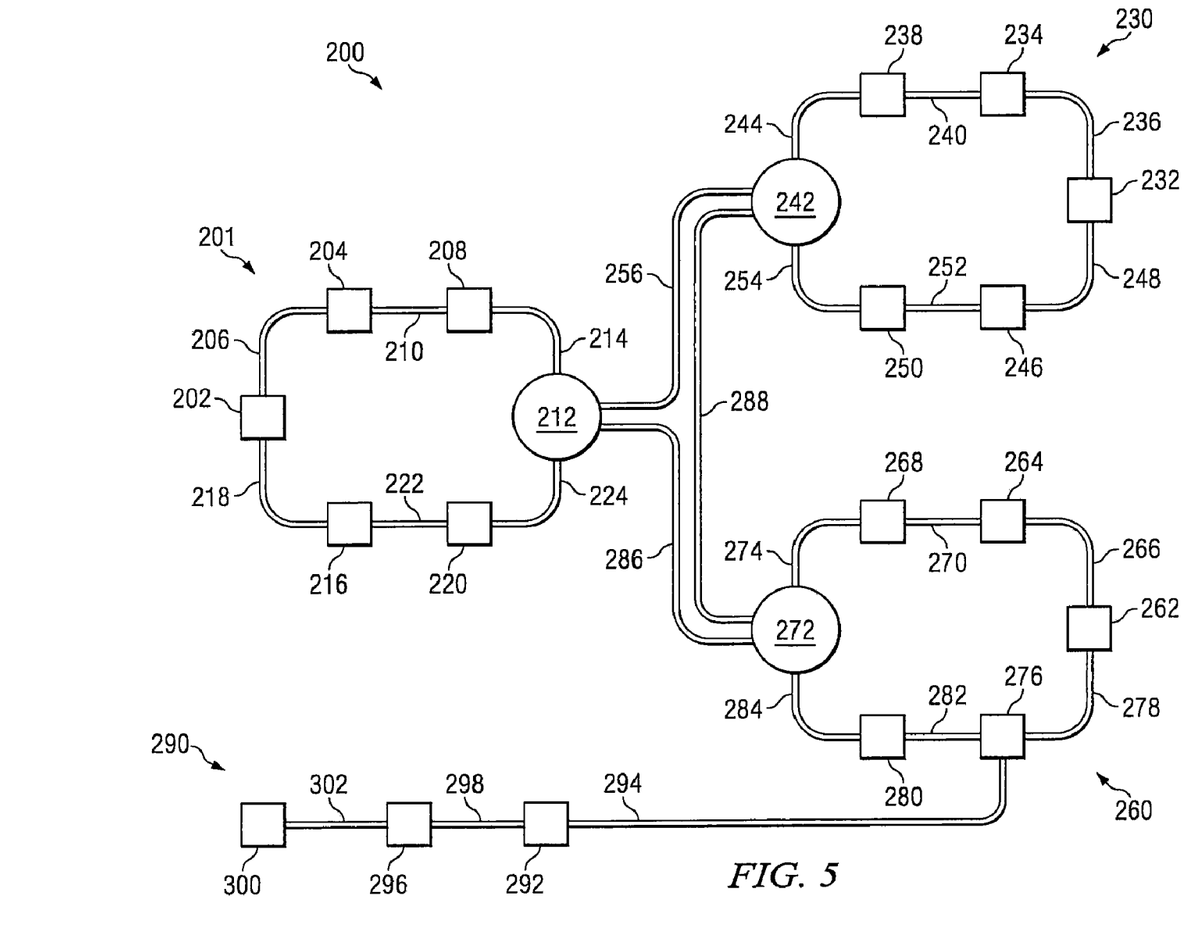
FIG. 5 illustrates a pneumatic transport system having multiple loops connected by diverters.

FIG. 5 illustrates transport system 200 as a more complex arrangement which includes diverters as described in FIG. 1. Pneumatic transport loop or chain 201 includes station 202 which is connected to station 204 by way of pneumatic travel tube 206 for routing the carrier between the stations; station 204 is connected to station 208 by way of pneumatic travel tube 210; station 208 is connected to diverter 212 by way of pneumatic travel tube 214; station 202 is connected to station 216 by way of pneumatic travel tube 218; station 216 is connected to station 220 by way of pneumatic travel tube 222; station 220 is connected to diverter 212 by way of pneumatic travel tube 224.

Pneumatic transport loop or chain 230 is part of system 200 and includes station 232 which is connected to station 234 by way of pneumatic travel tube 236 for routing the carrier between the stations; station 234 is connected to station 238 by way of pneumatic travel tube 240; station 238 is connected to diverter 242 by way of pneumatic travel tube 244; station 232 is connected to station 246 by way of pneumatic travel tube 248; station 246 is connected to station 250 by way of pneumatic travel tube 252; station 250 is connected to diverter 242 by way of pneumatic travel tube 254. Diverter 242 is connected to diverter 212 by way of pneumatic travel tube 256.

Pneumatic transport loop or chain 260 is also part of system 200 and includes station 262 which is connected to station 264 by way of pneumatic travel tube 266 for routing the carrier between the stations; station 264 is connected to station 268 by way of pneumatic travel tube 270; station 268 is connected to diverter 272 by way of pneumatic travel tube 274; station 262 is connected to station 276 by way of pneumatic travel tube 278; station 276 is connected to station 280 by way of pneumatic travel tube 282; station 280 is connected to diverter 272 by way of pneumatic travel tube 284. Diverter 272 is connected to diverter 212 by way of pneumatic travel tube 286. Diverter 272 is also connected to diverter 242 by way of pneumatic travel tube 288.

Pneumatic transport link 290 is also part of system 200 and includes station 292 which is connected to station 276 by way of pneumatic travel tube 294 for routing the carrier between the stations; station 292 is connected to station 296 by way of pneumatic travel tube 298; station 296 is connected to station 300 by way of pneumatic travel tube 302.

Pneumatic transport loops 201, 230, and 260 may be in different wings or floors of the hospital. To route a carrier from station 202 to station 232, the computer system controls intermediate stations 204 and 208 to pass the carrier through to diverter 212. Diverter 212 stops the carrier, rotates to align with tube 256, and sends the carrier to diverter 242. Diverter 242 stops the carrier, rotates to align with tube 244, and sends the carrier to station 238. Intermediate stations 238 and 234 are also set to pass-through mode and station 232 is set to capture mode so the carrier arrives at the intended destination. To then route a carrier from station 232 to station 262, the computer system controls intermediate stations 246 and 250 to pass the carrier through to diverter 242. Diverter 242 stops the carrier, rotates to align with tube 288, and sends the carrier to diverter 272. Diverter 272 stops the carrier, rotates to align with tube 274, and sends the carrier to station 268. Intermediate stations 268 and 264 are also set to pass-through mode and station 262 is set to capture mode so the carrier arrives at the intended destination.

Figure 6:
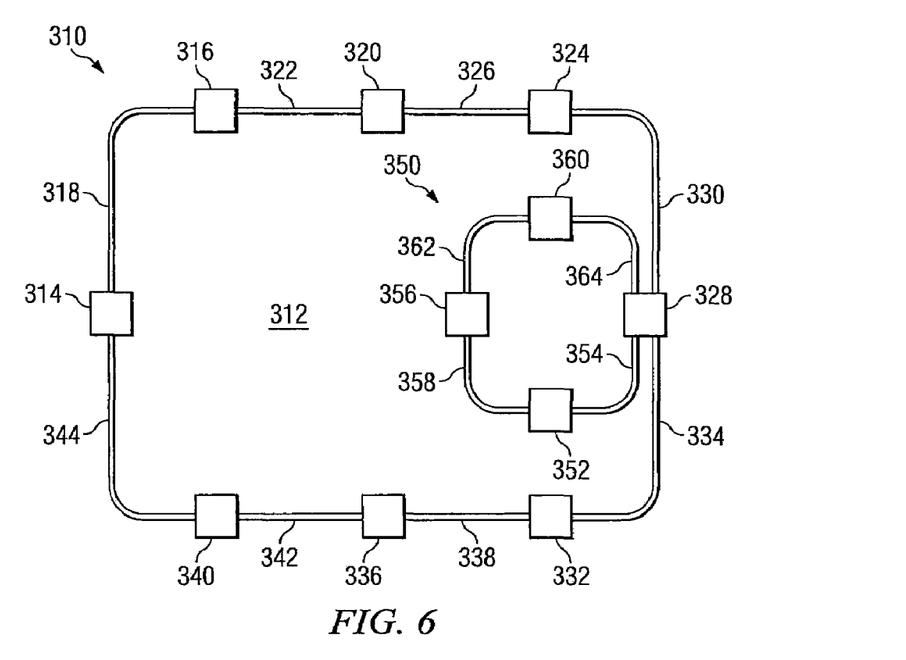
FIG. 6 illustrates another pneumatic transport system having multiple loops connected without any diverter.

FIG. 6 illustrates transport system 310 as one pneumatic transport loop connected to another transport loop, without using diverters. Pneumatic transport loop 312 includes station 314 which is connected to station 316 by way of pneumatic travel tube 318 for routing the carrier between the stations; station 316 is connected to station 320 by way of pneumatic travel tube 322; station 320 is connected to station 324 by way of pneumatic travel tube 326; station 324 is connected to station 328 by way of pneumatic travel tube 330; station 328 is connected to station 332 by way of pneumatic travel tube 334; station 332 is connected to station 336 by way of pneumatic travel tube 338; station 336 is connected to station 340 by way of pneumatic travel tube 342; station 340 is connected to station 314 by way of pneumatic travel tube 344.

Pneumatic transport loop 350 is also part of system 310 and includes station 352 which is connected to station 328 by way of pneumatic travel tube 354 for routing the carrier between the stations; station 352 is connected to station 356 by way of pneumatic travel tube 358; station 356 is connected to station 360 by way of pneumatic travel tube 362; station 360 is connected to station 328 by way of pneumatic travel tube 364.

To route a carrier from station 314 to station 328, the computer system controls intermediate stations 316, 320, and 324 to pass the carrier straight through to station 328, without the carrier stopping its motion. Alternatively, the carrier may pass straight through intermediate stations 340, 336, and 332 to get to station 328, again without the carrier stopping its motion. Station 328 is set to capture mode so the carrier arrives at the intended destination. To route a carrier from station 356 to station 328, the computer system controls intermediate station 360 to pass the carrier straight through to station 328, without the carrier stopping its motion. Alternatively, the carrier may pass straight through intermediate station 352 to get to station 328, again without the carrier stopping its motion. Station 328 is set to capture mode so the carrier arrives at the intended destination.

The cartridge assembly 152 in station 328 rotates between two sets of pneumatic travel tubes. The cartridge assembly in station 328 may have five tubes: two adjacent pass-through tubes, one loading tube, one receiving tube, and another pass-through tube between the loading tube and the receiving tube. The pass-through cartridge tubes provide a straight pass through between travel tubes 330 and 334 and between travel tubes 364 and 354. When a carrier is loaded, the loading cartridge tube aligns with the intended pneumatic travel tubes. When a carrier is received, the receiving cartridge tube aligns with the active pneumatic travel tube. The cartridge assembly then rotates and deposits the carrier in the drop bin.

In a similar manner, the cartridge assembly 152 in station 276 rotates between two sets of pneumatic travel tubes. When a carrier is loaded, the loading cartridge tube aligns with the intended pneumatic travel tubes. When a carrier is received, the receiving cartridge tube aligns with the active pneumatic travel tube. The cartridge assembly then rotates and deposits the carrier in the drop bin. Pneumatic transport link 290 and pneumatic transport loops 312 and 350 demonstrate that pneumatic loops and links can be connected without diverters.

Figure 7:
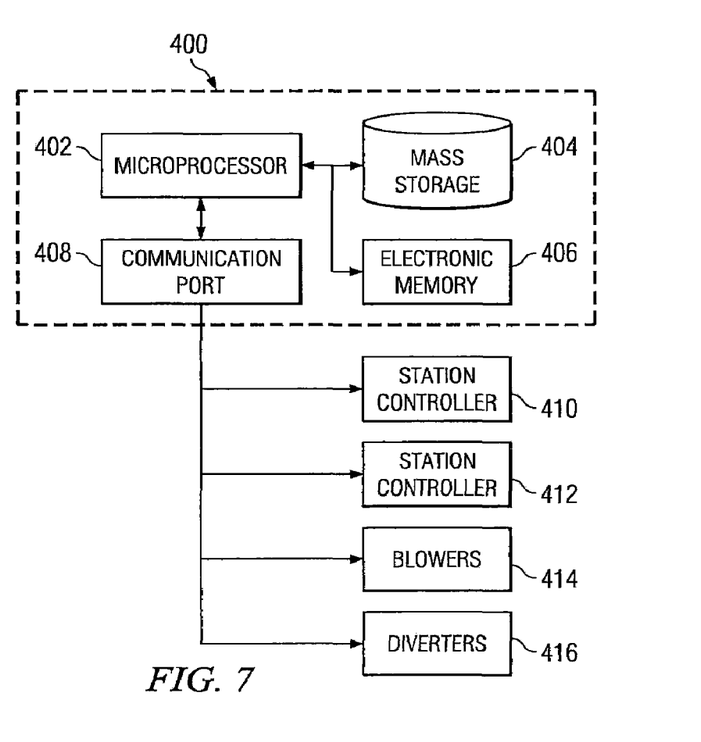
FIG. 7 illustrates a computer system for controlling the pneumatic transport system.

The pneumatic transport system 100 uses software operating on a computer system for controlling the transport of carriers between multiple stations utilizing stations, diverters, and blowers. FIG. 7 illustrates a simplified computer system 400 for executing the software program used in the pneumatic transport system 100. Computer system 400 is a general-purpose computer including a central processing unit or microprocessor 402, mass storage device or hard disk 404, electronic memory 406, and communication port 408. Communication port 408 represents an electronic connection to transmit and receive command and control data to system components, such as station controllers 410 and 412, blowers 414, and diverters 416.

The computer system runs application software and computer programs which can be used to control the system components, provide user interface, and provide the features of the pneumatic transport system 100. The software is originally provided on computer-readable media, such as compact disks (CDs), magnetic tape, or other mass storage medium. Alternatively, the software is downloaded from electronic links such as the host or vendor website. The software is installed onto the computer system hard drive 404 and/or electronic memory 406, and is accessed and controlled by the computer's operating system. Software updates are also electronically available on mass storage media or downloadable from the host or vendor website. The software, as provided on the computer-readable media or downloaded from electronic links, represents a computer program product usable with a programmable computer processor having computer-readable program code embodied therein. The software contains one or more programming modules, subroutines, computer links, and compilations of executable code, which perform the functions of the pneumatic transport system 100. The user interacts with the software via keyboard, mouse, voice recognition, and other user-interface devices connected to the computer system.

Figure 8:
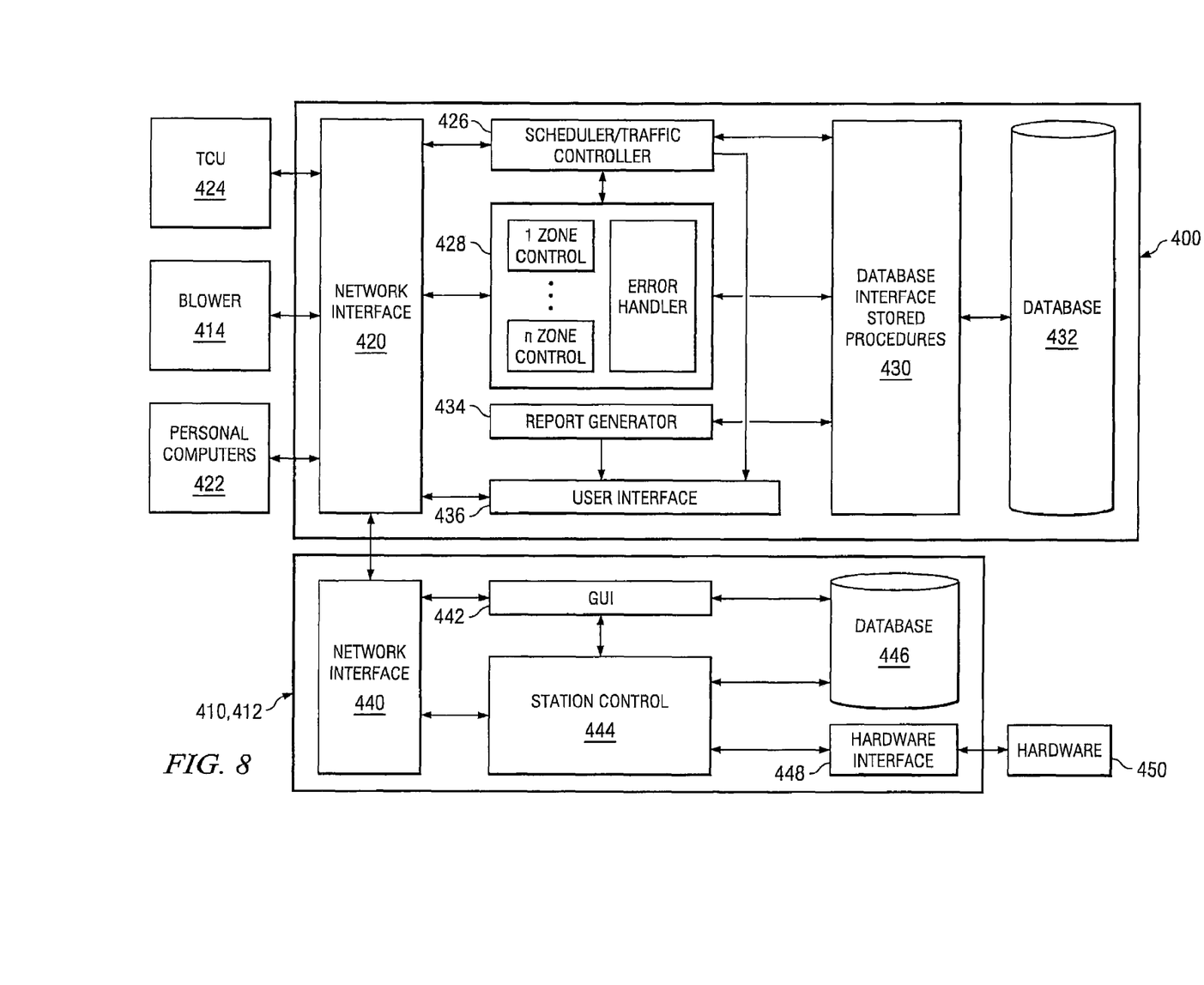
FIG. 8 illustrates further detail of the computer system for controlling the pneumatic transport system.

FIG. 8 illustrates further detail of the pneumatic transport control system. The control system includes the main computer controller, e.g., computer system 400, multiple station controllers 410 and 412, and embedded controllers for the blowers 414 and diverters 416. The main computer controller is responsible for processing all the information from all devices and managing the transfer of carriers through the system. The main computer controller contains software for configuring the pneumatic transport system 100, displaying carrier transport information, recording and displaying station, diverter, blower and zone status, processing carrier transport information from the stations, scheduling carrier transports, generating the optimal path for the carrier, executing a carrier transfer, reporting system errors, recording carrier transport information and storing the information in a database, and downloading software upgrades to all stations. The user interface has graphical user interface (GUI).

The main computer controller 400 has network interface 420 to blowers 414, person computers 422, and TCU 424. The network interface connects to scheduler and traffic controller 426 which schedules and tracks movement of all carriers and configuration of all stations with the pneumatic transport system 100. Zone controller 428 has electronic modules dedicated to control the stations within each loop or zone within the system. The zone controllers reside in their own threads that will spawn when control is needed. The up-to-date control information and any errors are sent through database interface 430 to database 432. The scheduler and traffic controller 426 also interfaces with database 432 and sends and receives information via user interface 436. Report generator 434 receives up-to-date configuration and status information from the database and presents the information to the user via user interface 436.

Each station controller contains software for receiving user commands through a GUI, transferring that information to the main computer controller, and controlling the hardware necessary to process a carrier transport, e.g., the rotatable cartridge assembly 152. Network interface 440 communicates with network interface 420 of the main computer 400. GUI 442 interacts with network interface 440, station controller 444, and station database 446. Likewise, station controller 444 interacts with network interface 440, station database 446, and hardware interface 448. Hardware interface 448 controls station hardware 450 such as the rotation of cartridge assembly 152, wear plate 178, and electric motors 160.

The communication between the stations, blowers, diverters, and main computer is done using transmission control protocol/internet protocol (TCP/IP). The system communication is propagated using the client/server model. The model is separated by two distinct categories that can be described as, a requestor of information the client, and the server of information the server. The stations and the main computer controller act as both the client and the server, while the blowers and the diverters act as a client.

The user interfaces in the system have security restrictions on them based on the user level of the individual operating the system. Users can create unique passwords and track individual utilizations of the system. The security model allows users to be added and removed from the system and assigns levels of security for each individual to manage the operation of the system. The security levels allow certain areas of the user interface to be controlled based on the user's security level, which helps restrict certain individuals from retrieving or sending restricted contents of a carrier. The security levels also prevent unauthorized users from modifying the system design or hardware operations.

The pneumatic transport system software utilizes .NET and structured query language (SQL) server technology to create a robust secure data system for generating, storing, and displaying the necessary data for executing and recording the transfer of carriers in the system. The system allows multiple stations to request, process, and execute carrier transfers. The system allows carrier paths to be generated from relationships between objects in the system. These relationships are stored as data in the SQL server database along with their attributes. The path generator will generate all possible paths between two stations. After analyzing each of the paths in terms of length, present usage, and off-line stations, the main computer controller determines the most efficient and effective path for a carrier to travel. All information transferring to and from the data base is executed through embedded stored procedures residing on the SQL server.

In addition, the data associated with each transport is stored in the SQL server database 432 for displaying on the user interfaces and for generating reports. The transport data includes start station, destination station, carrier contents, queue time, transfer time, and the path used for the transfer. Data associated with alarms and errors that occur in the system are also stored in the SQL server database 432.

The pneumatic transport system software provides a unique interface that allows users to design a transport system using a "tree view" approach in which the users graphically create a transport system by inserting, deleting, and modifying objects of the system. An object that is introduced into the tree view is stored, along with its attributes and relationships to other objects, in the SQL server database through a library of stored procedures. These relationships and attributes are gathered and utilized in SQL server store procedures to create the necessary paths for carriers to flow through the system. In addition, this data is used to update the user interface with information about carrier transactions, alarms, maintenance records, and paths.

Consider one example where the user enters a command to transport a carrier from one station to another. The user commands are received through GUI 442 which are sent through network interface 440 and network interface 420 to scheduler and traffic controller 426. The optimal path is selected based on system status and commands are sent via network interfaces 420 and 440 to each station controller 444 along the designated path. The hardware is configured by the station controllers and the carrier transport is made.

While one or more embodiments of the present invention have been illustrated in detail, the skilled artisan will appreciate that modifications and adaptations to those embodiments may be made without departing from the scope of the present invention as set forth in the following claims.

What is claimed is:

1. A pneumatic transport system, comprising:
   a carrier containing a material;
   a plurality of interconnected stations for transporting the carrier, each station including,
   (a) first and second pneumatic travel tubes for interconnecting the stations,
   (b) a rotatable cartridge assembly having a plurality of tubes, each tube configurable to be aligned with the first and second pneumatic travel tubes, the plurality of tubes having a first tube for pass-through of the carrier and a second tube having a tube wall, a first and second end of the tube wall defining first and second openings for loading the carrier into the second tube,
   (c) a wear plate assembly in slidable communication with the rotatable cartridge assembly, the wear plate assembly having a spring mechanism to bias the weight of the rotatable cartridge assembly off the wear plate, and
   (d) a collar coupled to the first or second pneumatic travel tube, the collar having a spring to bias the collar against a surface of the wear plate; and
   a computer system for executing object oriented computer code and controlling the configuration of each of the plurality of interconnected stations to provide transport of the carrier between first and second stations while passing through intermediate stations between the first and second stations without stopping movement of the carrier, the computer system having a path generator for defining a plurality of available paths between two interconnected stations and wherein the computer system selects a route for the carrier to travel between the two interconnected stations from the plurality of available paths between the two interconnected stations.

2. The pneumatic transport system of claim 1, wherein the wear plate assembly includes a center plate having a solid portion, an opening for passing the carrier, and an air-pass opening.

3. The pneumatic transport system of claim 1, further including an electric motor for rotating the rotatable cartridge assembly.

4. The pneumatic transport system of claim 1, further including a user interface for entering commands to the pneumatic transport system.

5. The pneumatic transport system of claim 1, wherein speed of the carrier is controlled through pressure within the first and second pneumatic travel tubes.

6. The pneumatic transport system of claim 5, further including a pressure release valve for controlling the pressure within the first and second pneumatic travel tubes.

7. The pneumatic transport system of claim 1, further including:
a first chain of the interconnected stations;
a second chain of the interconnected stations; and
a diverter connecting the first and second chains of the interconnected stations.

8. A computer-implemented method of controlling pneumatic transport of carriers, comprising:
transporting a carrier through a plurality of stations interconnected by pneumatic travel tubes;
rotating a cartridge assembly within each station to align cartridge tubes with the pneumatic travel tubes;
rotating a wear plate assembly, the wear plate assembly being in slidable communication with the rotatable cartridge assembly; and
controlling the configuration of each of the plurality of stations to provide transport of the carrier between first and second stations while passing through intermediate stations between the first and second stations without stopping movement of the carrier, wherein controlling the configuration of each of the plurality of stations includes defining a plurality of available paths between two interconnected stations and selecting a route for the carrier to travel between the two interconnected stations from the plurality of available paths between the two interconnected stations.

9. The computer-implemented method of claim 8, wherein the wear plate assembly includes a center plate having a solid portion, an opening for passing the carrier, and an air-pass opening.

10. The computer-implemented method of claim 8, further including providing an electric motor for rotating the cartridge assembly.

11. A pneumatic transport station, comprising:
first, second, and third pneumatic travel tubes for interconnecting a plurality of pneumatic transport stations;
a rotatable cartridge assembly having a plurality of tubes, each tube configurable to be aligned with either the first and second pneumatic travel tubes or the third pneumatic travel tube, the plurality of tubes of the rotatable cartridge having a first tube for pass-through of a carrier, and a second tube having first and second openings for loading the carrier into the second tube;
a wear plate assembly in slidable communication with the rotatable cartridge assembly, the wear plate assembly including a spring mechanism to bias the weight of the cartridge assembly off the wear plate; and
a computer system for controlling the configuration of the rotatable cartridge and wear plate to receive a carrier traveling via the first or second pneumatic travel tube and transmit the carrier via the third pneumatic travel tube.

12. The pneumatic transport station of claim 11, wherein the wear plate assembly includes a center plate, the center plate having a solid portion, an opening for passing the carrier, and an air-pass opening.

13. The pneumatic transport station of claim 11, including a collar coupled to the first, second, or third pneumatic travel tube, the collar having a spring to bias the collar against a surface of the wear plate.

14. The pneumatic transport system of claim 11, wherein the computer system includes a path generator for defining a plurality of available paths between two interconnected stations and wherein the computer system selects a route for the carrier to travel between the two interconnected stations from the plurality of available paths between the two interconnected stations.

15. A computer-implemented method of controlling pneumatic transport of carriers, comprising:
providing a control station connected to a first and second pneumatic transport loop, the first and second pneumatic transport loop each having a plurality of interconnected stations;
transporting a carrier through the first pneumatic transport loop;
receiving the carrier from the first pneumatic transport loop into a cartridge tube of a cartridge assembly within the control station;
rotating the cartridge assembly to align the cartridge tube with the second pneumatic transport loop;
transporting the carrier through the second pneumatic transport loop; and
controlling the configuration of each of the plurality of interconnected stations to provide transport of the carrier through the first or second pneumatic transport loop without stopping movement of the carrier, wherein controlling the configuration of each of the plurality of interconnected stations includes defining a plurality of available paths between two interconnected stations and selecting a route for the carrier to travel between the two interconnected stations from the plurality of available paths between the two interconnected stations.

16. The computer-implemented method of claim 15, further including providing a wear plate assembly in slidable communication with the rotatable cartridge assembly.

17. The computer-implemented method of claim 16, wherein the wear plate assembly includes a center plate having a solid portion, an opening for passing the carrier, and an air-pass opening.

18. The computer-implemented method of claim 15, further including providing an electric motor for rotating the cartridge assembly.

* * * * *